Jan. 6, 1942.  A. HARRISON ET AL  2,268,588
FURNACE, PARTICULARLY ADAPTED FOR PRODUCING FERRIC
OXIDE FROM FERROUS SULPHATE
Original Filed June 1, 1939  3 Sheets-Sheet 1
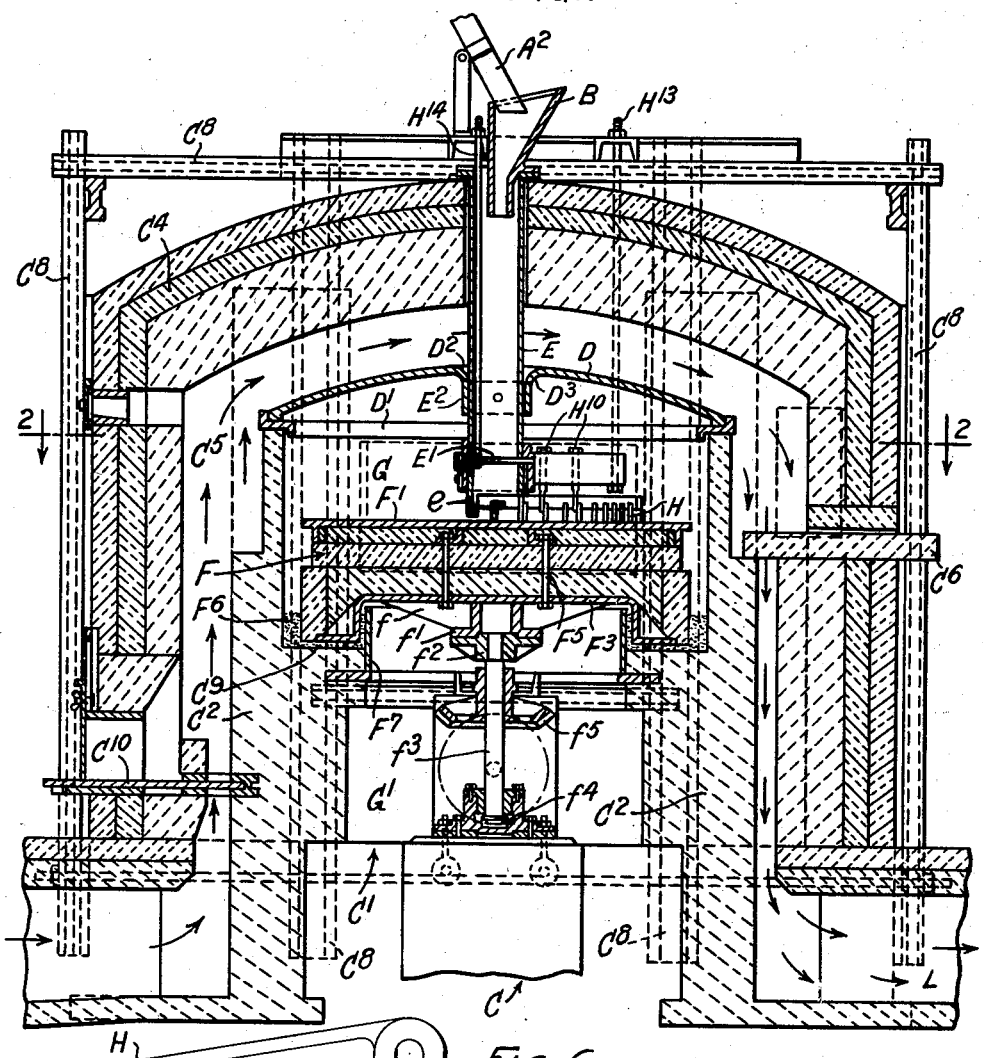
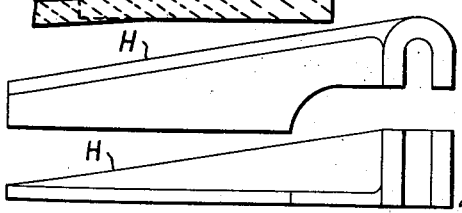

Jan. 6, 1942.  A. HARRISON ET AL  2,268,588
FURNACE, PARTICULARLY ADAPTED FOR PRODUCING FERRIC
OXIDE FROM FERROUS SULPHATE
Original Filed June 1, 1939  3 Sheets-Sheet 2
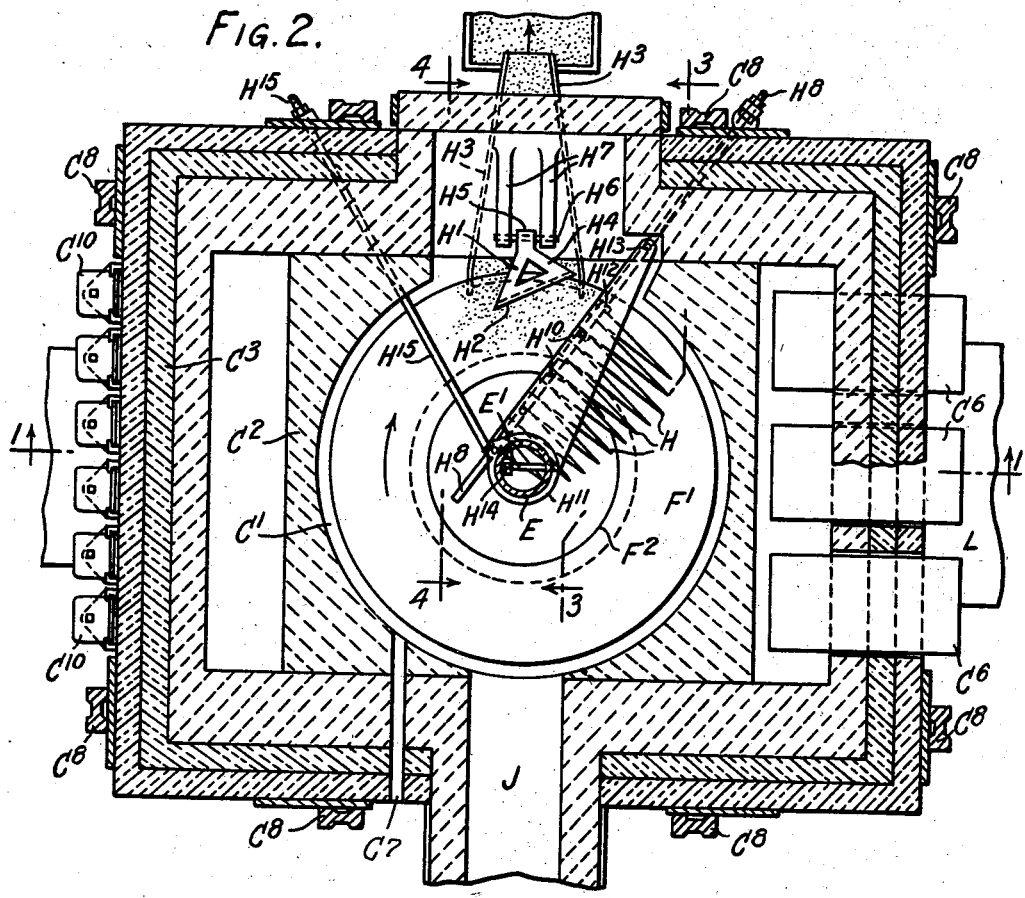
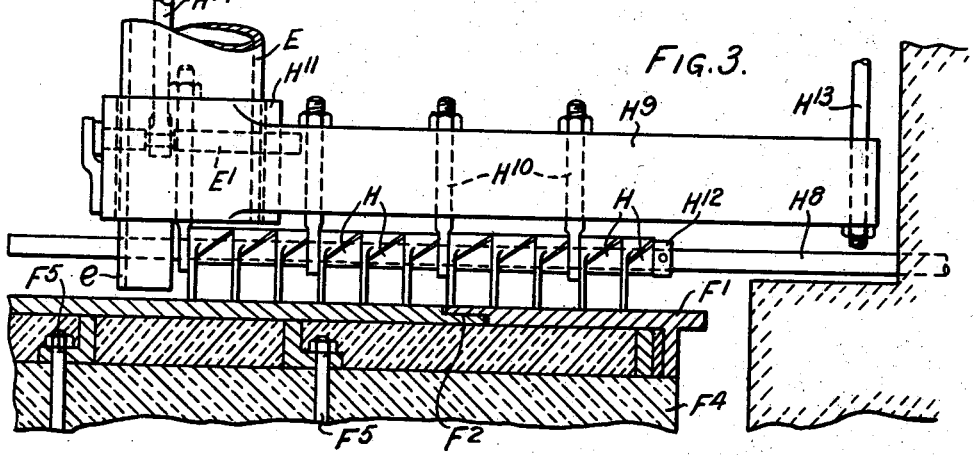
INVENTORS Jan. 6, 1942. A. HARRISON ET AL 2,268,588
FURNACE, PARTICULARLY ADAPTED FOR PRODUCING FERRIC
OXIDE FROM FERROUS SULPHATE
Original Filed June 1, 1939  3 Sheets-Sheet 3

INVENTORS
Allen Harrison
Frederic Barnes Waldron
by Morrison, Kennedy & Campbell
Attorneys Patented Jan. 6, 1942

2,268,588

UNITED STATES PATENT OFFICE 2,268,588

FURNACE, PARTICULARLY ADAPTED FOR PRODUCING FERRIC OXIDE FROM FERROUS SULPHATE

Allen Harrison, Whiston, and Frederic Barnes Waldron, Prescot, England, assignors to Pilkington Brothers Limited, Liverpool, England, a limited-liability company of Great Britain Original application June 1, 1939, Serial No. 276,764. Divided and this application November 30, 1939, Serial No. 306,782

15 Claims. (Cl. 263—21)

This invention relates to a furnace which is particularly adapted for producing ferric oxide from ferrous sulphate or copperas.

As set forth in our copending application Serial No. 276,764, filed June 1, 1939, of which the instant application is a division, ferric oxide has a number of uses, among which may be mentioned by way of example, the manufacture of plate glass wherein it is used as a polishing medium and also the manufacture of paint, wherein it is used as a pigment. When used as a glass polishing medium, it is commonly termed rouge and must be free from gritty substances and other contamination so that no harmful results will befall the glass during the polishing process. One source of ferric oxide is waste pickle liquor, that is, ferrous sulphate or copperas that has been formed from the acid used for pickling sheets in the tin plate mills. Several ways are known of converting the ferrous sulphate to ferric oxide, that most commonly employed being to dehydrate the ferrous sulphate in a muffle kiln and calcine the resultant ferrous sulphate monohydrate to decompose it into ferric oxide, sulphur dioxide, sulphur tri-oxide and water. The production of rouge by this method is not altogether satisfactory, since it is contaminated with gritty refractory material from the kiln structure. A further source of contamination is the pickle liquor itself, since the crystallising tanks used at the tin plate works are usually brick lined.

It is a relatively simple matter to eliminate contamination resulting from the second mentioned source. This may be readily accomplished by redissolving the ferrous sulphate in water and allowing the solution to remain, for a suitable period, in a settling tank to allow gritty substances to settle out.

One of the important features of the present invention resides in the means provided for eliminating the first mentioned source of contamination, namely, that from the refractory material of the kilns in which the monohydrate is calcined. This has been accomplished by a special furnace construction wherein all the parts that might be a source of contamination are made of metal. Early experiments conducted with a rotary inclined type all-metal kiln exteriorly heated, met with little success, one of the chief reasons being that, at the temperatures met with in the production of ferric oxide for rouge (i. e., temperatures in the neighbourhood of 885° C.), substantial caking on the walls of the kiln occurred, requiring considerable increases in temperature and in the amount of heat employed and necessitating frequent shutting down of the plant in order to remove the caked oxide. Laboratory investigation has shown that particles of ferric oxide will stick to themselves as well as to most materials at temperatures of 750° C.

In the improved muffle furnace or kiln, the ferrous sulphate monohydrate is deposited at the centre of a turntable hearth located in a calcining chamber and gradually moved to the periphery of the table by a series of rabble bars located above the table. During its excursion from the centre to the periphery of the table the charge of monohydrate undergoes calcination and is decomposed into ferric oxide, sulphur dioxide, sulphur trioxide and water. The ferric oxide is scooped off the table at its outer edge and dropped into a chute leading to the outside of the furnace. The evolved gases are passed first to a lime tower, and thence to the atmosphere. The surface of the turntable or hearth as well as the rabble bars are made of metal in order that there be no contamination from this source. Since the rabble bars, in co-operation with the rotation of the hearth, positively actuate the material undergoing treatment, outwardly toward the periphery of the table, sticking of the ferric oxide to the table is prevented. Such sticking is also prevented by effecting calcination solely through the use of radiant heat. For this purpose, the calcining chamber is enclosed at the top by a metal dome exteriorly heated by the combustion of raw producer gas and, because the dome is metal, the trouble due to spalling of a refractory arch with its accompanying depositing of gritty material in the charge, is eliminated. All of the metal parts that are subjected to high temperature are made of a special steel, the only one found satisfactory to withstand conditions in the calcining furnace being "Vesuvius" steel manufactured by Firths-Vickers Stainless Steels, Limited.

According to other features of the invention, means are provided for accommodating the expansion and contraction of the metal parts subject to high temperatures, and for isolating the turntable driving mechanism from the temperatures and acid conditions of the calcining chamber. These and other features of the invention will be evident as the description of the invention proceeds.

Referring to the drawings:

Figure 1 is a vertical cross-sectional view of a furnace equipped with the present improvements and particularly suitable for carrying out the improved process;

Figure 2 is a horizontal sectional view on line 2—2 of Figure 1;

Figure 3 is a partial vertical sectional view on line 3—3 of Figure 2 and showing in detail the construction of and the means for suspending the rabble bars;

Figure 6 is a side view of one of the rabbles H as seen from the right in Figure 3, on an enlarged scale; and Figure 7 is a view of the same from below.

Figure 5:
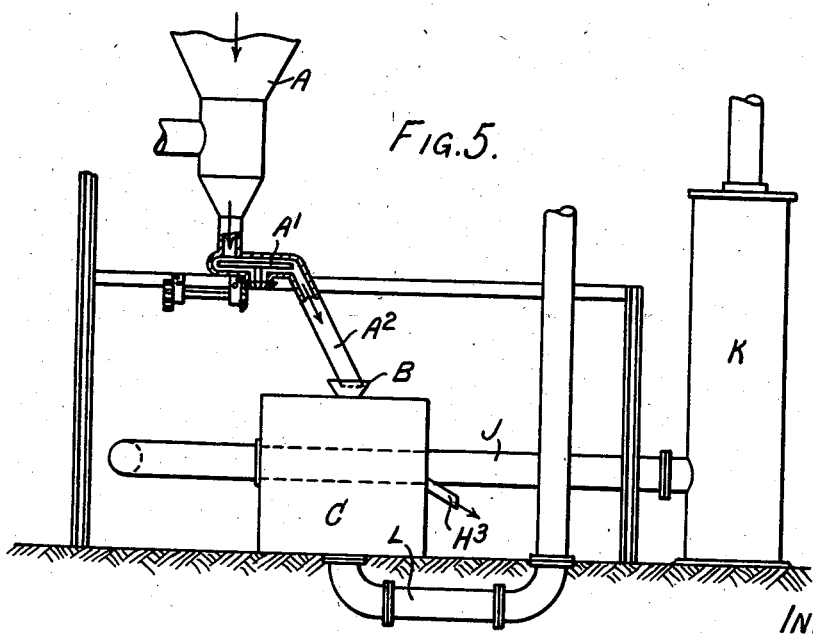
Figure 5 is a diagrammatic view of a portion of the apparatus for carrying out that phase of the process with which the instant invention deals.

As previously stated, the first step in the process of converting waste pickle liquor to ferric oxide involves freeing the liquor of the contained impurities as it comes from the tin plate mills. This step is effected by dissolving the ferrous sulphate in tanks in the presence of iron to take up any free acid that may be present. The solution is then blown into a lead lined settling tank maintained by steam pipes at a temperature of approximately 60 C., thus enabling a highly concentrated solution to be obtained. The solution then enters an atomizing chamber A (Figure 5) under a constant head in which chamber the ferrous sulphate is reduced to monohydrate form. Insofar as an understanding of the present invention is concerned, the details of the apparatus for converting the ferrous sulphate to ferrous sulphate monohydrate need not be described, but if a description thereof is desired, reference may be had to U. S. Patent No. 1,607,206, issued to O. S. Neill, November 16, 1926. Suffice it to say, monohydrate ferrous sulphate collects in the form of small spheres at the bottom of the atomizing chamber A, from which it is fed through the medium of a turntable $A^1$, driven at a suitable speed, to a pipe $A^2$ leading to a hopper B located at the top of a calcining furnace C (see Figure 1).

The calcining furnace C (Figures 1 and 2) includes a central circular chamber $C^1$, defined by vertical walls $C^2$ formed of suitable refractory material, and a top consisting of a metal dome D to which further reference will be made later on. The furnace further includes outer walls $C^3$ and arched top $C^4$ which are of usual furnace construction, these walls at two sides of the furnace and at the top thereof being spaced from the outer surfaces of the walls and dome defining the circular chamber C in order to provide a passageway or flue $C^5$ in which raw producer gas is burned to supply the necessary heat for decomposing the monohydrate to ferric oxide and the other products. The circulation of the combustion gases is indicated by the arrows in Figure 1, and is controlled to maintain proper furnace temperature by means of suitable dampers $C^6$ and $C^{10}$. A peephole $C^7$ is provided in the outer furnace wall at about the level of the dome in order that a check may be had upon combustion conditions. A steel frame-work consisting of vertical and of horizontal members $C^8$ is provided for the purpose of supporting certain elements in the furnace hereinafter described.

As previously stated, the ferric sulphate monohydrate is introduced into the furnace from the hopper B, through a vertical tube E extending from the top of the furnace down through the metal dome D and terminating at its lower end just above a turntable hearth F. This turntable divides the circular central chamber C into an upper calcining chamber G and a lower chamber $G^1$ wherein there are located the devices for effecting the rotation of the turntable.

Figure 4:
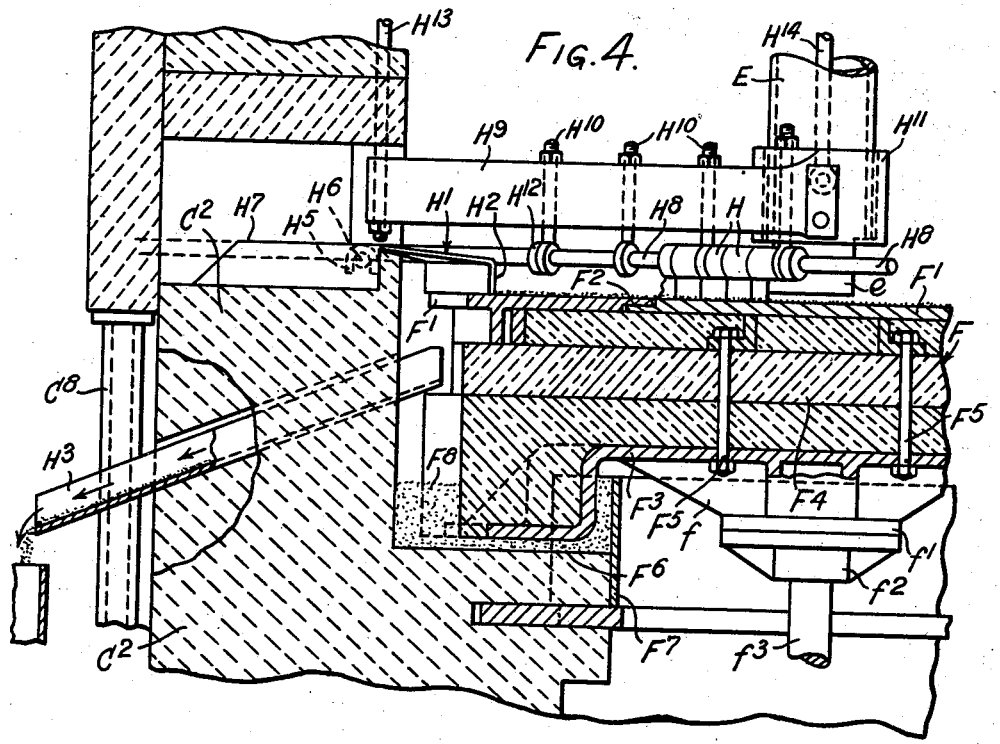
Figure 4 is a partial vertical sectional view on line 4—4 of Figure 2 and showing in detail, the means for isolating the mechanism for rotating the turntable hearth from the calcining chamber.

The turntable hearth itself (see Figures 1, 3 and 4) includes in part an upper circular metal plate $F^1$ made in two concentric parts with an intermediate joint $F^2$ to provide for expansion and contraction. The turntable further includes a lower casting $F^3$ and a series of intermediate layers of refractory material $F^4$, the whole being joined together by vertical bolts $F^5$ so that the turntable will rotate as a unit. The lower member $F^3$ of the turntable is formed with ribs $f$ for strength and is provided with a flange $f^1$ resting upon a complementary flanged element $f^2$ fixed at the top of a vertical shaft $f^3$ supported at its lower end by a thrust bearing $f^4$. Likewise on the vertical shaft there is fixed a bevelled gear $f^5$, the hub portion of which is suitably journalled to maintain the shaft in its vertical position, the bevel gear being driven through means not shown to effect rotation of the turntable.

Near its outer periphery, the overall thickness of the turntable is somewhat greater than the overall thickness in its centre portion, and this thicker portion of the hearth moves in an annular channel $F^6$ formed by the side wall $C^2$ of the chamber, a horizontal shelf $C^9$ presented by such side wall and a vertical cylindrical element $F^7$ supported in a suitable manner and extending up beyond and within the confines of the outer thicker portion of the turntable previously referred to. Some loose material $F^8$ such as sand or diatomaceous earth capable of withstanding high temperatures is contained in the channel $F^6$ and acts as a seal to prevent the passage of heat and oxides of sulphur from the calcining chamber above the turntable to the chamber below the turntable wherein the mechanism for rotating the latter is contained, the purpose, of course, being to prevent any detrimental effect that the heat or gases might otherwise have on the metal of which the driving mechanism is made.

In the charging of the furnace, the ferrous sulphate monohydrate, passes down the central tubular element E, and is deposited on the centre of the turntable which is rotated in a clockwise direction looking at the parts from the top (see Figure 2). As the table rotates, a series of rabbles H overlying the table gradually moves the material from the centre of the table outwardly towards the periphery thereof. These rabbles are best shown in Figures 2 and 3 and on an enlarged scale in Figures 6 and 7. It will be noticed that the rabbles vary in length, the arrangement being such that when any portion of the material on the table engages a given rabble, such material will, as the table continues to rotate, be pushed by the rabble, depending upon its length, a distance outwardly toward the periphery of the table, and when the table has made another rotation, the material thus moved will be in a position to be engaged by the next adjacent rabble located outwardly therefrom. Assuming a furnace with eleven rabbles, and a turntable rotation at the rate of 1 R. P. M., the material would be in the furnace under treatment approximately eleven minutes.

The material that has progressed to the outer edge of the table is scooped off by a scraper element $H^1$ (Figures 2 and 4) having a vertical portion H² located at an angle with respect to a tangent to the table at the point where the scraper is located, and which slants progressively outwardly, the leading edge of the scraper being within the periphery of the table and the trailing edge without the periphery thereof. This scraper acts to force the finished ferric oxide off the table and into a chute H³ through which the material passes to the outside of the furnace. The scraper element further includes a triangular shaped upper section H⁴ with a depending bifurcated portion H⁵ at its outer end resting upon a bar H⁶ extending between two block supports H⁷. The scraper element is thus supported by the bar H⁶ and by the turntable itself. At this point, it might be stated that the wall of the feed tube E at the side opposite the rabbles extends below the lower edge of the main body of the tube to form a segmental shield which acts to prevent the material deposited on the table from spreading in a direction other than toward the rabbles.

The rabble bars H are arranged on a horizontal bar H⁸ which passes outwardly through the furnace wall where it is anchored to a member of the framework C⁸ (Figures 2 and 3). That portion of the bar which extends within the furnace is suspended from an overlying member H⁹ by means of a series of eye bolts H¹⁰ arranged at suitable intervals along said member and which, together with a collar H¹² pinned to the bar adjacent the outermost rabble, tend to hold the rabbles in their proper positions. The supporting member H⁹ is formed at its inner end with a collar H¹¹ surrounding the tubular element E and is itself in turn supported in position by a pair of long bolts H¹³, H¹⁴ extending upwardly beyond the roof of the furnace where they are secured at their upper ends to the frame-work. The long bolt H¹³ more remote from the centre of the furnace passes through the supporting member H⁹ at its outer end and is provided with a nut engaging the lower face of the supporting member and serving to fix its position. The long bolt H¹⁴ located near the centre of the furnace actually passes down through the tubular element E and is formed at its lower end with an eye through which there extends a transverse bar E¹ passing not only through the walls of the tubular element but also through the walls of the collar H¹¹, thus serving to anchor all of the elements together at this point. The transverse bar E¹ is headed at one end, which head is engaged by an offset portion of another bar H¹⁵ bolted to the collar H¹¹ and which extends horizontally and at an angle with respect to the bar H⁸ likewise to the outside of the furnace where it is anchored in position in the framework. According to this arrangement the tubular element, at its lower end as well as the device that supports the rabbles is effectively held against movement in all directions.

As previously stated, the calcining chamber G is closed at the top by a circular metal dome D (Figure 1) supported at its outer periphery on a metal rim D¹ having a horizontal portion resting on top of the wall C², an upstanding vertical flange which acts to prevent the dome from spreading under the influence of heat, and a depending flange which acts to locate the rim with respect to the circular wall of the chamber and prevent its displacement. A hole D² is provided in the centre of the dome D through which the tubular member E passes and around the edge of the hole, the dome is bent downwardly to form a lip D³ which engages a collar E² encircling the tubular member and which is fixed thereto. This collar serves to support the dome adjacent its centre. The dome, being metal, eliminates one of the troubles heretofore encountered with a brick or refractory dome in that there is no spalling and consequent dropping of foreign gritty substances into the material undergoing treatment.

While it is true that in prior art furnaces, the refractory roofs of calcining chambers have been in the form of a dome or arch, they partook of such form for a reason entirely different from that for which the metal dome of the instant structure is so shaped. A brick roof requires an arch or dome shape in order that it be self-supporting. This is not true of the metal roof, since it can be made as an integral structure with sufficient strength in itself to be self-supporting. In other words, insofar as strength is concerned, the metal roof could just as well be flat as in the form of a dome and actually such a flat roof was tried with the present furnace. While the flat roof was satisfactory in every way as far as the manufacture of rouge, free from contamination, was concerned, it developed that after long periods of use, sagging in the roof occurred requiring suspension of operations. The longest period of operation without suspension for this reason was in the neighbourhood of fourteen weeks. Since, however, it was desired to have the process a continuous one over long periods of time, a dome shaped metal roof was resorted to, means being provided at the outer edge of the roof to prevent spreading. With this arrangement, the expansion that occurs in the metal is evidenced by an upward movement of the dome at its centre, and it is for this reason that there is no positive connection between the dome and the supporting collar E². Thus, it will be seen that while the roof in its preferred form partakes of somewhat the same shape as refractory roofs heretofore used, such shape is for an entirely different purpose and causes the roof to function in an entirely different way.

The gaseous products resulting from the decomposition of ferrous sulphate monohydrate, namely, sulphur dioxide, sulphur trioxide and water, pass from the calcining chamber G through a flue J (Figure 2) to a lime filled tower K (Figure 5) wherein the sulphur oxides are absorbed before the gases are allowed to pass to the atmosphere. The waste gaseous products of combustion pass out through a flue L at the bottom of the furnace and the heat recovered, if desired, for use in earlier stages of the process.

Care must be taken to maintain the velocity of the gases passing from the calcining chamber to an absolute minimum to prevent rouge from being carried away. The velocity of these gases is increased by the evolution of $SO_2$, $SO_3$ and $H_2O$ in the process and tends to cause a slight back pressure up the tubular feed pipe E.

All of the metal parts that are subjected to the calcining temperatures, namely, the revolving disc F¹, rabbles H, bars H⁸, and H¹⁵, bolts H¹³, H¹⁴, tubular feed E, the muffle dome D, etc., are made of the special "Vesuvius" steel heretofore referred to, since thus far this steel is the only one that has been found satisfactory for the purpose. The present improvements in the process and furnace were developed only after considerable expense and experimental work and, so far as the applicants know, provide the only satisfactory method for producing rouge by a continuous process.

In the accompanying drawings, the invention has been shown merely by way of example and in preferred form, and obviously many variations and modifications may be made therein which will still be comprised within its spirit. It is to be understood, therefore, that the invention is not limited to any specific form or embodiment, except insofar as such limitations are specified in the appended claims.

Having described our invention, we declare that what we claim and desire to secure by Letters Patent is:

1. A high temperature muffle furnace including, in combination, a turntable with metal top on which the material to be treated is deposited, a chamber closed at the bottom by said turntable, a metal roof closing the chamber at the top, a passageway extending around the said chamber and above the said roof through which hot gases are circulated, and means for preventing access of heat from the passageway to the metal top of the turntable except by radiation from the roof of the chamber.

2. A high temperature muffle furnace including, in combination, a table on which the material to be treated is deposited, a chamber wherein the table is located, a metal dome closing the chamber at the top, a passageway above the dome through which hot gases are circulated, and a metal rim at the top of the chamber upon which the dome is supported at its outer edge, said rim being formed with an upturned edge against which the edge portion of the dome abuts and acting to prevent spreading in the dome despite the high temperature and consequent expansion to which the dome is subjected.

3. A high temperature muffle furnace including, in combination, a table on which the material to be treated is deposited, a chamber wherein the table is located, a metal dome closing the chamber at the top, a passageway above the dome through which hot gases are circulated, a centrally located and vertically arranged tubular device extending through an opening in the dome and through which the furnace is charged, means on the tubular device for supporting the dome near its centre, a metal rim at the top of the chamber for supporting the dome at its outer edge, said rim being arranged to limit spreading in the dome and said dome being free to move with respect to its inner support so as to accommodate expansion of the dome under the influence of heat.

4. A high temperature muffle furnace including, in combination, a table on which the material to be treated is deposited, a chamber wherein the table is located, a one-piece metal dome closing the chamber at the top, a passageway above the dome through which hot gases are circulated, a centrally located and vertically arranged tubular device extending through an opening in the dome and through which the furnace is charged, means on the tubular device for supporting the dome near its centre, a metal rim at the top of the chamber for supporting the dome at its outer edge, said rim being arranged to limit spreading in the dome and said dome being free to move with respect to its inner support so as to accommodate expansion of the dome under the influence of heat.

5. A high temperature muffle furnace including, in combination, an externally heated calcining chamber closed at the top by a metal dome and at the bottom by a turntable with metal top on which the material to be treated is deposited, a series of metal rabbles overlying the turntable and adapted as the table is rotated to move the material undergoing treatment gradually from the centre of the table to the periphery thereof, and a tubular metal element extending upwardly from the centre of the table and having an opening through which the calcining chamber can be charged from outside of the furnace.

6. A high temperature muffle furnace including, in combination, an externally heated calcining chamber having a side wall, a metal dome closing the chamber at the top, a turntable on which the material to be treated is deposited, arranged at the bottom of said chamber, a centrally located tubular element extending through said dome and having an opening through which said calcining chamber can be charged from outside the furnace, means on the tubular element for supporting the metal dome near its centre, a metal rim located at the top of the side wall of the chamber for supporting the metal dome at its outer edge and acting to limit spreading in said metal dome and said dome being free to move with respect to its center support so as to accommodate an expansion in the dome under the influence of heat.

7. A high temperature muffle furnace including, in combination, a turntable with metal top on which the material to be treated is deposited, a series of metal rabbles overlying the turntable and adapted, as the table is rotated, to move the material gradually from the centre to the periphery. a chamber surrounded by the furnace wherein the turntable and the rabbles are located, a metal roof closing the chamber at the top, a passageway above the said roof through which hot gases are circulated, means for preventing access of heat from the furnace to the metal top of the turntable except by radiation from above the top, and means for feeding the material to be treated from outside the furnace to the centre of the table.

8. A high temperature muffle furnace including, in combination, a turntable with metal top on which the material to be treated is deposited, a series of metal rabbles overlying the turntable and adapted, as the table is rotated, to move the material gradually from the centre to the periphery, a chamber surrounded by the furnace wherein the turntable and the rabbles are located, a metal rim with upturned edge on the chamber walls, a dome-shaped metal roof closing the chamber at the top having its edges abutting against the upturned edge of the rim, a passageway above the said roof through which hot gases are circulated, means for preventing access of heat from the furnace to the metal top of the turntable except by radiation from above the top, and means for feeding the material to be treated from outside the furnace to the centre of the table.

9. A high temperature muffle furnace including, in combination, a turntable with metal top on which the material to be treated is deposited, a series of metal rabbles overlying the turntable and adapted, as the table is rotated, to move the material gradually from the centre to the periphery, a chamber surrounded by the furnace wherein the turntable and the rabbles are located, a metal roof closing the chamber at the top, a passageway above the said roof through which hot gases are circulated, heat insulating material on which the metal top of the turntable rests adapted to prevent access of heat to the metal top except by radiation from above the top, and means for feeding the material to be treated from outside the furnace to the centre of the table.

10. A high temperature muffle furnace including, in combination, a turntable with metal top on which the material to be treated is deposited, a series of metal rabbles overlying the turntable and adapted, as the table is rotated, to move the material gradually from the centre to the periphery, a chamber surrounded by the furnace wherein the turntable and the rabbles are located, walls below the chamber adapted to prevent access of hot gases from the furnace to the underside of the chamber, a metal roof closing the chamber at the top, a passageway above the said roof through which hot gases are circulated, and means for feeding the material to be treated from outside the furnace to the centre of the table.

11. A high temperature muffle furnace including, in combination, a turntable with metal top on which the material to be treated is deposited, a series of metal rabbles overlying the turntable and adapted, as the table is rotated, to move the material gradually from the centre to the periphery, a chamber surrounded by the furnace wherein the turntable and the rabbles are located, walls below the chamber adapted to prevent access of hot gases from the furnace to the underside of the chamber, a metal roof closing the chamber at the top, a passageway above the said roof through which hot gases are circulated, heat insulating material on which the metal top of the turntable rests adapted to prevent access of heat to the metal top except by radiation from above the top, and means for feeding the material to be treated from outside the furnace to the centre of the table.

12. A high temperature muffle furnace including, in combination, a chamber surrounded by the furnace, a metal roof closing the chamber at the top, a turntable with metal top on which the material to be treated is deposited closing the chamber at the bottom, a series of metal rabbles overlying the turntable and adapted, as the turntable is rotated, to move the material gradually from the centre of the periphery, a passageway above the said roof through which hot gases are circulated, means for preventing access of heat from the furnace to the metal top of the turntable except by radiation from above the top, and means for feeding the material to be treated from outside the furnace to the centre of the table.

13. A high temperature muffle furnace including, in combination, a chamber surrounded by the furnace, a metal roof closing the chamber at the top, a turntable with metal top on which the material to be treated is deposited closing the chamber at the bottom, a series of metal rabbles overlying the turntable and adapted, as the turntable is rotated, to move the material gradually from the centre of the periphery, a passageway above the said roof through which hot gases are circulated, heat insulating material on which the metal top of the turntable rests adapted to prevent access of heat to the metal top except by radiation from above the top, and means for feeding the material to be treated from outside the furnace to the centre of the table.

14. A high temperature muffle furnace including, in combination, a chamber surrounded by the furnace, a metal roof closing the chamber at the top, a turntable with metal top on which the material to be treated is deposited closing the chamber at the bottom, walls below the chamber adapted to prevent access of hot gases from the furnace to the underside of the turntable, a series of metal rabbles overlying the turntable and adapted, as the table is rotated, to move the material gradually from the centre of the periphery, a passageway above the said roof through which hot gases are circulated, and means for feeding the material from outside the furnace to the centre of the table.

15. A high temperature muffle furnace including, in combination, a chamber surrounded by the furnace, a domed metal roof closing the chamber at the top, a turntable with metal top on which the material to be treated is deposited, closing the chamber at the bottom, a series of metal rabbles overlying the turntable and adapted, as the turntable is rotated, to move the material gradually from the centre to the periphery, a passageway above the said roof through which hot gases are circulated, means for preventing access of heat from the furnace to the metal top of the turntable except by radiation from above, and a tubular metal element extending upwardly from above the centre of the table and having an opening through which the material can be fed from outside the furnace to the centre of the table.

ALLEN HARRISON.
FREDERIC BARNES WALDRON.